United States Patent
Jackson et al.

(10) Patent No.: US 9,698,578 B1
(45) Date of Patent: Jul. 4, 2017

(54) SLOTTED BUS BAR FOR ELECTRICAL DISTRIBUTION

(71) Applicant: Ilsco Corporation, Cincinnati, OH (US)

(72) Inventors: Stephen M. Jackson, Batavia, OH (US); Thomas M. Sweeney, Cincinnati, OH (US)

(73) Assignee: Ilsco Corporation, Cincinnati, OH (US)

( * ) Notice: Subject to any disclaimer, the term of this patent is extended or adjusted under 35 U.S.C. 154(b) by 0 days.

(21) Appl. No.: 15/376,762

(22) Filed: Dec. 13, 2016

Related U.S. Application Data

(60) Provisional application No. 62/275,285, filed on Jan. 6, 2016.

(51) Int. Cl.
| | |
|---|---|
| *H02B 1/20* | (2006.01) |
| *H01R 4/30* | (2006.01) |
| *H02G 5/02* | (2006.01) |

(52) U.S. Cl.
CPC .............. *H02B 1/20* (2013.01); *H01R 4/302* (2013.01); *H01R 4/304* (2013.01); *H02G 5/025* (2013.01)

(58) Field of Classification Search
CPC . H02B 1/21; H02G 5/025; H02G 5/02; H02G 5/10; H01R 25/14; H01B 5/02
USPC .......................................... 174/70 B; 339/21
See application file for complete search history.

(56) References Cited

U.S. PATENT DOCUMENTS

| | | | |
|---|---|---|---|
| 3,210,716 A * | 10/1965 | Meacham | H02B 1/21 174/171 |
| 3,337,697 A | 8/1967 | Martin et al. | |
| 3,786,313 A | 1/1974 | Coles et al. | |
| 4,030,794 A | 6/1977 | Rozenboom et al. | |
| 4,057,312 A * | 11/1977 | Hagermo | H01R 11/12 174/94 S |
| 4,419,715 A * | 12/1983 | Pear | H02B 1/21 174/133 B |
| 4,538,879 A | 9/1985 | Wagener | |
| 4,778,412 A | 10/1988 | Walter et al. | |
| 4,832,627 A | 5/1989 | Wagener et al. | |
| 5,722,787 A | 3/1998 | Mazura et al. | |
| 5,876,224 A * | 3/1999 | Chadbourne | H01R 25/142 439/110 |

(Continued)

FOREIGN PATENT DOCUMENTS

| | | |
|---|---|---|
| DE | 3123149 A1 | 12/1982 |
| DE | 3921665 | * 10/1991 |

(Continued)

*Primary Examiner* — Michael F McAllister
(74) *Attorney, Agent, or Firm* — Wood Herron & Evans LLP

(57) ABSTRACT

A bus bar for electrical power distribution may be an elongated extruded metal bar having slots extending the entire length thereof. The slots may be of T-shape cross section, each with the channel opening through a face of the bar. Bolts are arranged with their heads captured in, and slidable along the length of the slots to any desired position. The bolts may have threaded stems which extend from the head through the channel of the T-slot in which its head is disposed and beyond that face of the bar through which the associated T-slot opens. Each stem is adapted to threadably receive a nut for clamping, supporting or connecting lugs to the bar. The bus bars can be mounted on insulating support members.

19 Claims, 4 Drawing Sheets

(56) References Cited

U.S. PATENT DOCUMENTS

| | | | | |
|---|---|---|---|---|
| 6,045,379 | A * | 4/2000 | Wagener | H01R 25/162 |
| | | | | 439/212 |
| 6,056,561 | A * | 5/2000 | Lin | H01R 25/142 |
| | | | | 439/121 |
| 6,086,389 | A | 7/2000 | Wagener | |
| 6,113,439 | A | 9/2000 | Wagener | |
| 6,164,988 | A | 12/2000 | Wagener | |
| 6,381,122 | B2 | 4/2002 | Wagener | |
| 6,489,567 | B2 | 12/2002 | Zachrai | |
| 6,506,068 | B2 | 1/2003 | Wagener | |
| 6,616,465 | B1 * | 9/2003 | Fontana | H02G 5/02 |
| | | | | 174/68.2 |
| 6,672,889 | B2 | 1/2004 | Biermeier et al. | |
| 6,994,571 | B2 * | 2/2006 | Hoffmann | H01R 25/142 |
| | | | | 439/110 |
| 7,335,041 | B2 | 2/2008 | Haubach | |
| 7,434,362 | B2 | 10/2008 | Liebendorfer | |
| 7,638,711 | B2 | 12/2009 | Wagener | |
| 7,655,865 | B2 | 2/2010 | Wagener | |
| 8,289,680 | B2 * | 10/2012 | Keegan | H05K 7/1432 |
| | | | | 174/117 R |
| 8,480,414 | B2 | 7/2013 | Carnevale et al. | |
| 8,608,383 | B2 | 12/2013 | Watson | |
| 2012/0222881 | A1 * | 9/2012 | Van Dooren | H02B 1/20 |
| | | | | 174/68.2 |
| 2014/0342585 | A1 * | 11/2014 | Benedetti | H02G 5/02 |
| | | | | 439/110 |

FOREIGN PATENT DOCUMENTS

| | | |
|---|---|---|
| DE | 102008040292 A1 | 1/2010 |
| DE | 102012013828 A1 | 5/2014 |
| JP | 5378085 B2 | 12/2013 |
| SE | WO 2010124728 * | 11/2010 |

* cited by examiner

SLOTTED BUS BAR FOR ELECTRICAL DISTRIBUTION

This claims the benefit of U.S. Provisional Patent Application Ser. No. 62/275,285, filed Jan. 6, 2016 and hereby incorporated by reference in its entirety.

BACKGROUND OF THE INVENTION

This invention relates to a bus bar for electrical power distribution.

In the field of electrical power devices, a wide range of devices are known and currently available for distributing, converting, producing, and applying power. Depending upon the application, such devices may distribute incoming power to various devices and/or convert incoming power from one form to another as needed by a load. In a typical drive system arrangement, for example, constant (or varying) frequency alternating current power (such as from a utility grid or generator) is converted to controlled frequency alternating current power to drive motors, and other loads. In this type of application, the frequency of the output power can be regulated to control the speed of the motor or other device. Further, drive system buses may distribute the power throughout the process. In a motor control center application, a bus system may facilitate distribution of power to a number of system components and devices. For example, a motor control center bus may be utilized to provide power to a drive system bus. Further, such electrical installations may include bus work that communicatively couples the components with a power source and/or other components.

Bus bars 1 for electrical distribution have been in the form of metallic straps which are first cut to length and then provided with sets of holes 3 through which bolts 5 are received for mounting the bus bars on suitable supports within a cabinet, for connecting them to each other, and for mounting electrical cable connectors 7 for conductors 9 thereon as shown generally in FIGS. 1A and 1B. Usually the locations of the holes 3 are predetermined for specific arrangements, the holes being punched by the manufacturer at precise predetermined positions.

Moreover, with the prior art bus bars and the associated supports, a technician needs to have access underneath the bus bar for a wrench or the like for securing the supports and bus bar to each other and the supporting surface. As a result, the height of the bus bar from the supporting surface is significant to provide for clearance and required access.

The use of holes in specific positions along the bus bars limits the possible positions of the bus bars relative to each other and to supporting structure to specific arrangements of the original design. Consequently, for each different type and size of installation, holes have to be specially laid out and punched in the bus bars. Considerable layout time and expense is involved in positioning and punching the selected holes. This is both inefficient and labor intensive.

Another undesirable feature of prior bus bar designs is that the current carrying capacity of the bars is not uniform for all cross sections throughout its length as the total cross section for conducting metal is reduced at those areas in which the holes are provided relative to those areas in which no hole is provided. Accordingly, assuming a bar of uniform thickness and overall width, to provide an amount of conducting cross section at the location of the holes sufficient to meet the rated maximum current carrying capacity of the bar results in an excess of conducting cross section at the imperforate portions, and a resultant waste or inefficient use of the metal.

Traditionally, such bus work is manufactured to a specific length with punched holes or a combination of cabling and bus work to provide for electrical transmission to components. Such bus work may be directly affixed to an electrical enclosure by a fastener (e.g., a nut and bolt assembly) and a non-conductive standoff. Such bus work and attachment features can be complex, expensive, nonadjustable and/or difficult to configure. Many such bus bars must comply with standards for the hole spacing such as NEMA 1.7. Traditional bus work may be generally cumbersome and only enable coupling of attachment features at specific locations on the bus (e.g., punched holes along the bus). Additionally, traditional bus systems and support structures require substantial changes to accommodate different amperage levels or installation requirements.

Accordingly, it is now recognized that it would be desirable to develop a bus system that facilitates electrical conductivity and the like in a flexible configuration, enables simplified manufacturing changes to accommodate different amperage levels and electrical enclosure arrangements, enables convenient coupling of attachment features at generally any location along the bus and delivers consistent capacity along the bus bar.

SUMMARY OF THE INVENTION

The invention in various embodiments is a copper or aluminum bar with one or more T or other shaped slots in the upper surface to which lugs are bolted to the bar via a compatible connector seated in the slot. In this way, the position of the connector on the bar is adjustable and the mounting capacity of the bar is maximized. An insulator or non-conductive support member is used to attach the bus bar. The attaching bolt for the insulator is recessed to allow attachment of electrical devices across the entirety of the bus bar surface. A slot may also be provided in the bottom surface of the bar for adjustable mounting of the isolator.

The lugs may include a downwardly extending tab on the bottom of the lug which seats against the upper edge of the bar or in a groove on the top of the bar to prevent the lug from twisting or rotating relative to the bar.

In accordance with various embodiments of this invention, the bus bar can be a length cut from a simple extrusion with certain slots therein extending the full length thereof, and so shaped and arranged that suitable attachment features or lugs can be positioned and secured firmly in place at any location desired along the length of the bar, and so that two lengths of the bar can be connected together readily in end to end relation with their faces coplanar or with their faces at an abrupt angle to each other. Traditional bus bars may be as much as twice as wide as bus bars according to this invention to accommodate similar connection schemes. Also, electrical connections can be made to the bar at any position desired along the length of the bar. Further, the lengths of bar may be attached readily to supporting structures at any and all locations along its length. This allows for unique and specialized configurations for mounting the bus bar assembly in electrical enclosures or other enclosures. The required NEMA spacing is readily accommodated with the bus bar system of this invention. The spacing between the lugs on this bus bar is dictated by the width of the lugs and not the standard NEMA spacing of 1.75 inches or the like. Moreover, the support members for the bus bar allow for less clearance than prior designs and the bus bars can be mounted end to end with no interference from mounting hardware. In addition to conductor attachment hardware such as lugs and the like, the tang of a fuse may be directly attached to the bus bar of this invention.

Various other objects and advantages will become apparent from the following description wherein reference is made to the accompanying drawings.

BRIEF DESCRIPTION OF THE DRAWINGS

The above-mentioned and other features and advantages of this invention, and the manner of attaining them, will become more apparent and the invention itself will be better understood by reference to the following description of embodiments of the invention taken in conjunction with the accompanying drawings, wherein.

DETAILED DESCRIPTION OF THE INVENTION

Figure 1A:
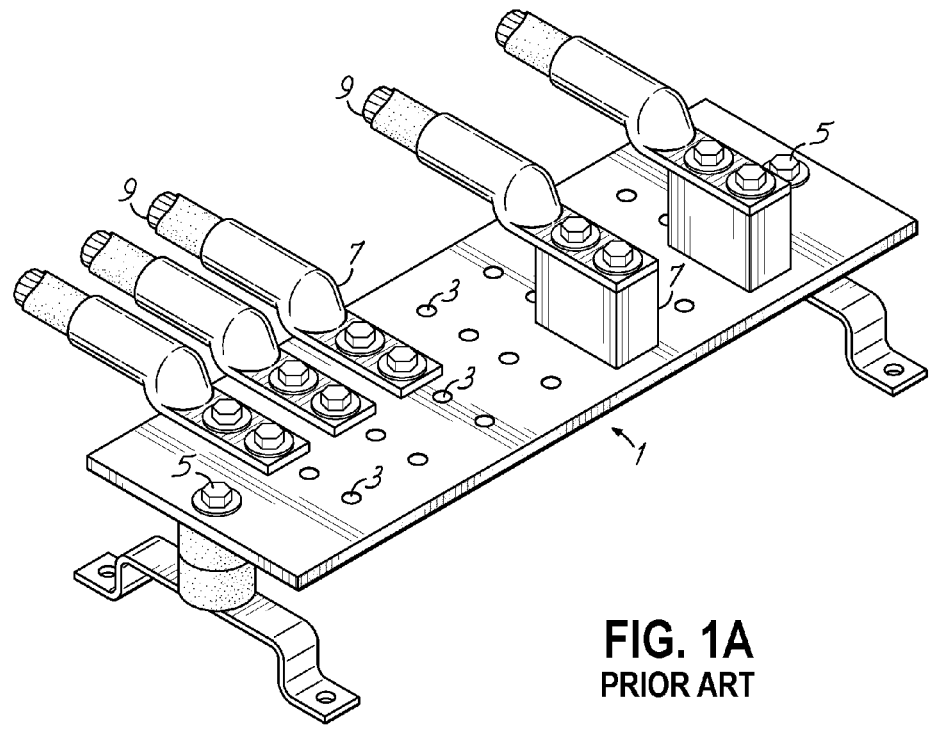
FIGS. 1A and 1B are each perspective views of prior art bus bars for electrical distribution.
Figure 1B:
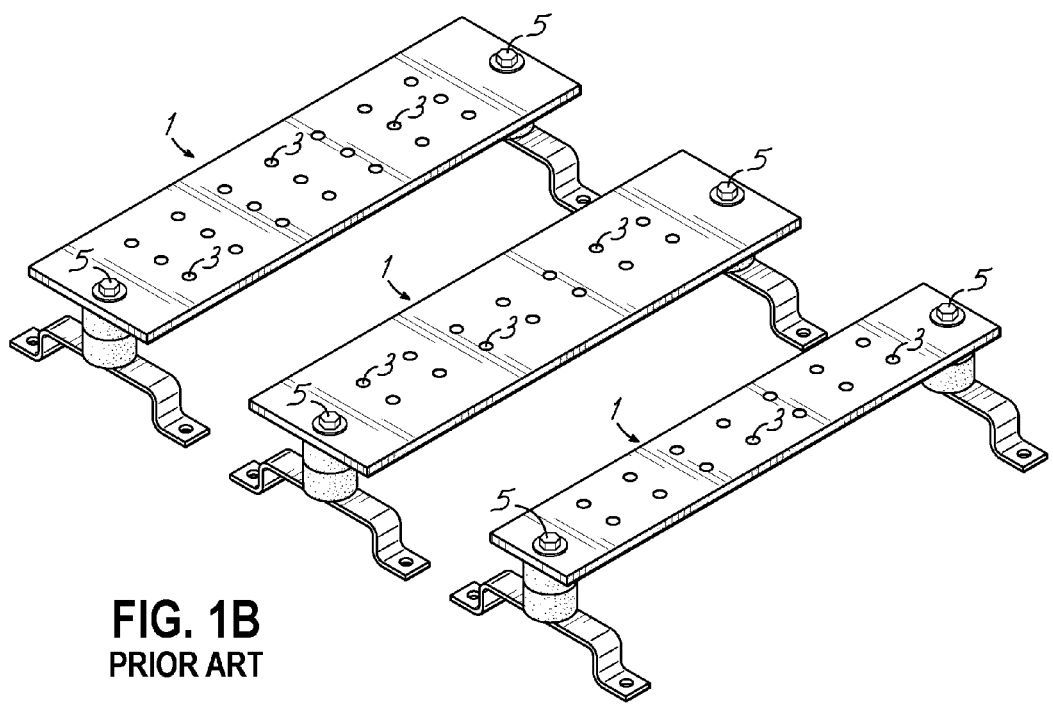

As discussed in detail below, embodiments of this invention provide a bus system 10 that facilitates flexible configuration and connection of components to a bus bar 12. In particular, this invention provides an extruded bus bar 12, as well as attachment features 14 and support members 16 for the bus bar 12. A support member 16 includes an insulated component that supports the bus bar 12 for attachment.

References in the specification to "one embodiment," "an embodiment," or "an exemplary embodiment," indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Figure 2A:
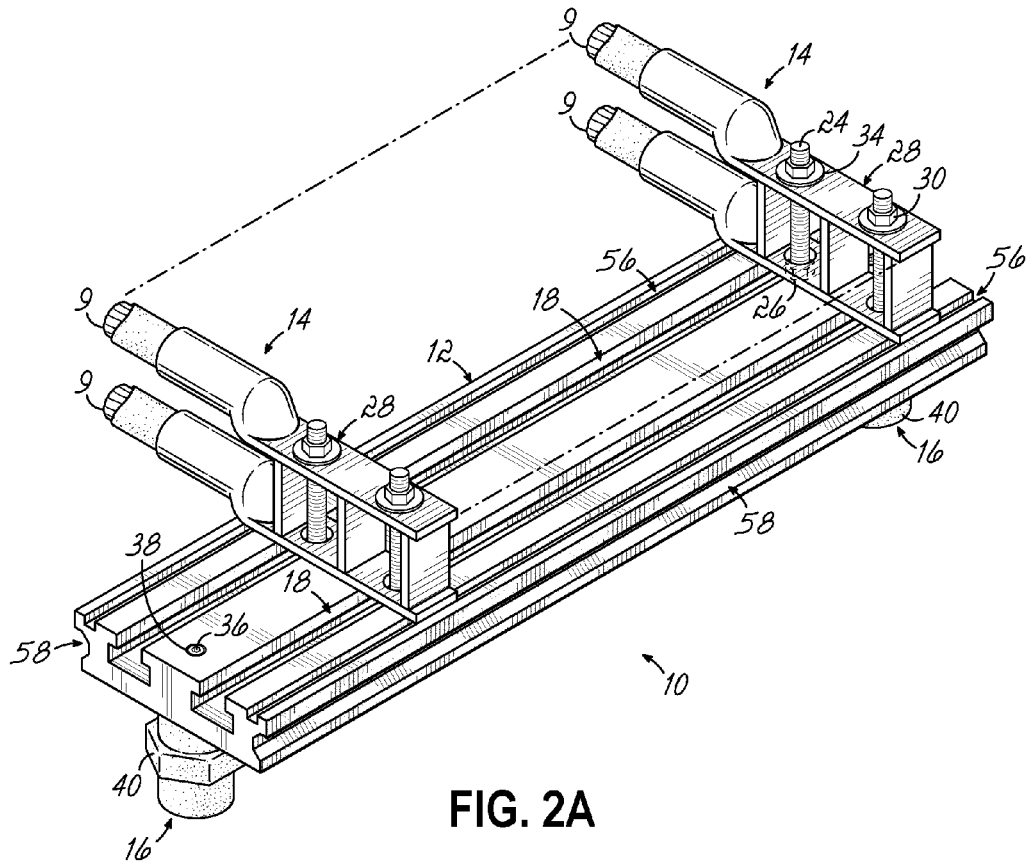
FIGS. 2A and 2B are each perspective views of slotted bus bars for electric distribution according to various embodiments of this invention.
Figure 2B:
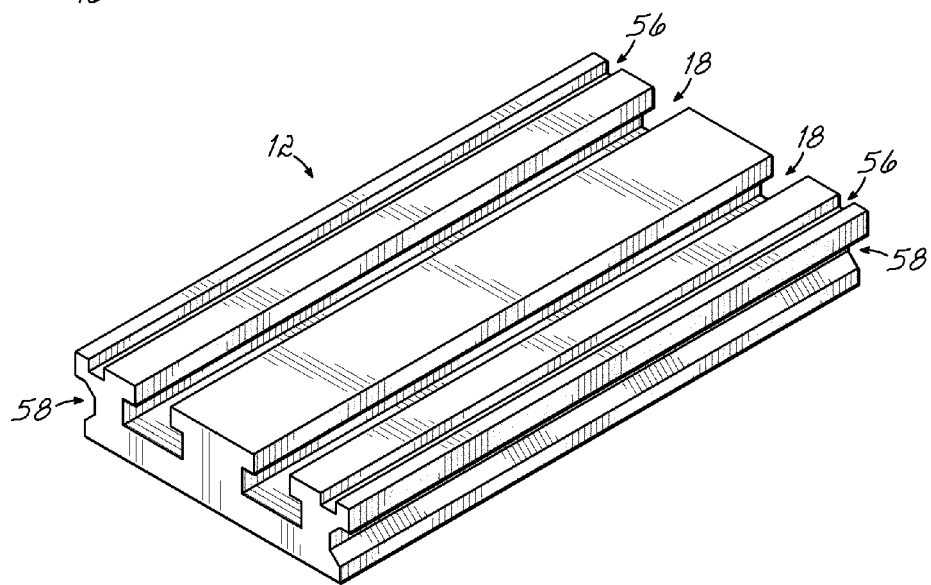

FIG. 2A illustrates a front perspective view of a universal bus bar assembly 10. The universal bus bar assembly 10 includes a bus bar 12 and support members 16 directly attached at opposite ends and of the bus bar 12 attaching the universal bus bar system 10 to a mounting surface. The universal bus bar system 10 is configured to attach to various types or numbers of conductors 9 in an electrical system, to provide additional functionality to solve some of the issues experienced with prior bus bar assemblies. The universal bus bar system 10 may be used in industrial automation, building automation, control systems, power systems, telecommunications systems, or other applications where an electrical system is installed.

The bus bar 12 may be extruded using a conductive material such as bare copper, tin-plated copper, aluminum, tin-plated aluminum, bronze, nickel, silver, gold plating or other types of conductive material. The extrusion process allows for easy size, shape, and configuration changes in the bus bar 12. In other embodiments, the bus bar 12 may be manufactured using varying manufacturing processes or other types of materials. In other embodiments, the length of the bus bar may vary.

During operation of the illustrated embodiments, the bus bar 12 receives power and distributes the power to various components via the conductors 9. The bus bars 12 may function to provide three-phase AC power from an electrical grid from the utility company or other power generation source such as a generator, photo-voltaic or wind source to drive systems that function to reduce the three-phase AC power from the grid to a level that is desirable for a particular load, such as a motor. That is, the bus bars 12 function to distribute power to the systems at a voltage and frequency of the power source, distribute power within the systems as direct or alternating current, and distribute power out of the systems to the load at a desired voltage and frequency for the load.

Each of the illustrated attachment features 14 receives a conductor 9 and is configured to couple with one of the slots 18 in the bus bar 12. The attachment features 14 may take any of a variety of configurations such as the lugs shown in FIGS. 2A and 6. The slots 18 have a cross-section that includes a narrow channel 20 in communication with an expanded cavity 22. Thus, the slots 18 can slideably receive a component of the attachment features 14 with a narrow neck 24 and an expanded distal end 26 such as a threaded bolt having a head and a shaft or other mechanical fastener. In other words, a component of an attachment feature 14 including a narrow neck 24 and an expanded distal end 26 can slide along one of the slots 18 when the narrow neck or shaft 24 is positioned within the narrow channel 20 and the expanded distal end or head 26 is positioned within the expanded cavity 22. For example, in the illustrated embodiment of FIG. 2A, the attachment feature 14 includes a pair of bolts that pass through a bracket or body 28 of the attachment feature 14 and into the slots 18. The attachment features 14 and associated bolt head 26 may be inserted into the corresponding slots 18 at an end of the bus bars 14 or via openings that are manufactured into each of the slots 18. By positioning the bolts 14 within the slots 18 in this manner, a nut 30 on the upper end of the bolt shaft 24 can be tightened such that the head 26 of the bolt 14 is pulled against an inner lip 32 of each slot 18. Thus, the attachment feature 14 is securely fastened to the bus bar 12. A washer 34 may be included on the attachment feature 14 as shown in FIG. 2A.

Multiple slots 18 are employed in the face of the bus bars 12 of FIGS. 2A, 2B, 3, 5 and 6 to increase the quantity of the attachment features 14 on the bus bar 12 and to facilitate uniform contact between the bus bar 12 and the attachment features 14. It should be noted that while two slots 18 are provided in the bus bar embodiment illustrated by FIGS. 2A-3, 5 and 6, in other embodiments, only one slot or additional slots may be included.

Figure 3:
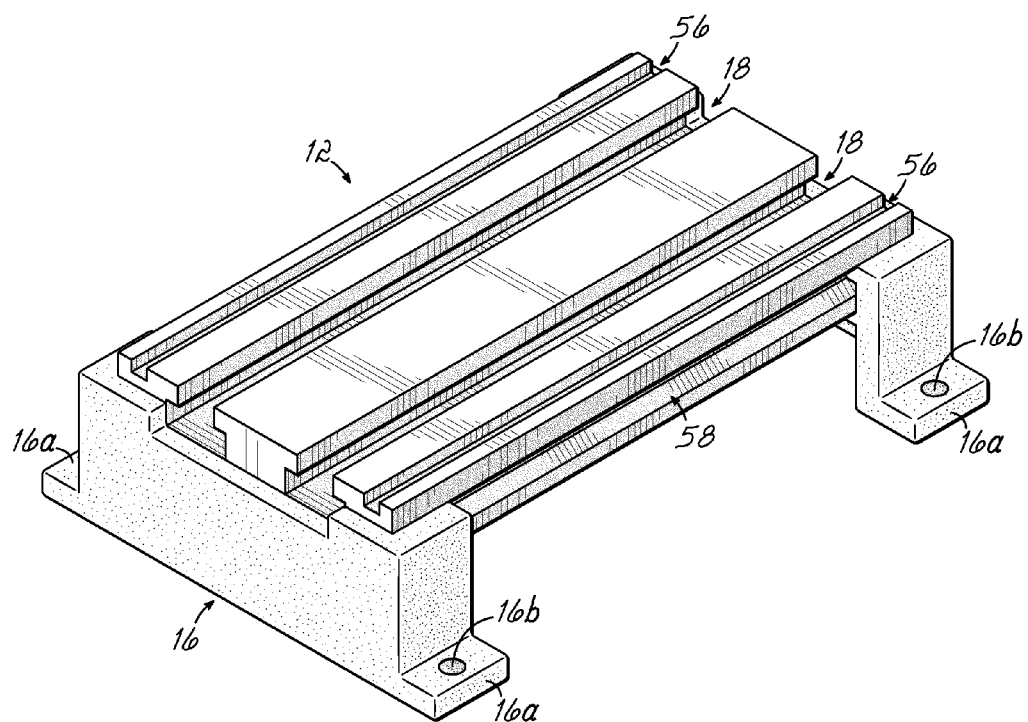
FIG. 3 is a perspective view of a further embodiment of a slotted bus bar for electric distribution according to this invention.
Figure 4:
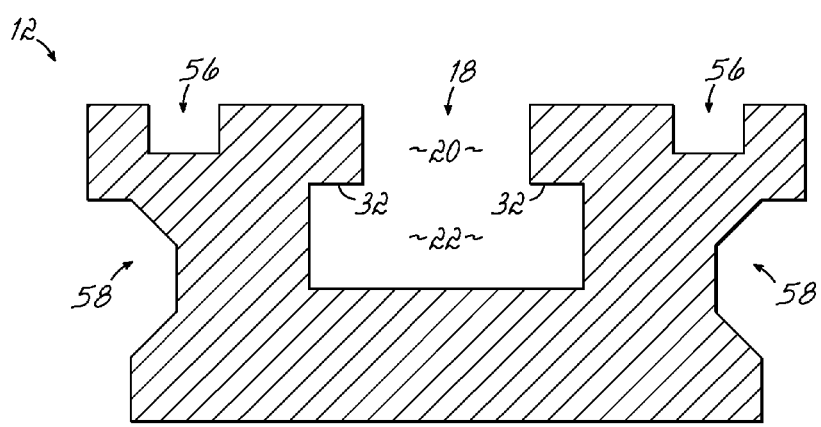
FIG. 4 is a cross sectional view of a still further embodiment of a slotted bus bar for electric distribution according to this invention.
Figure 6:
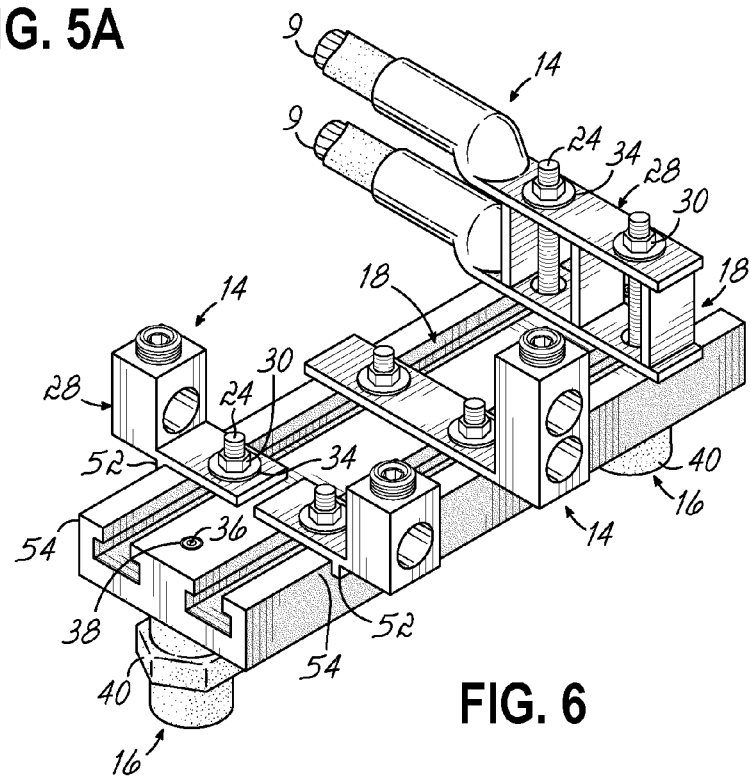
FIG. 6 is a perspective view of another embodiment of a slotted bus bar for electric distribution according to this invention.

FIGS. 2A, 3 and 6 illustrate various embodiments of an isolative support member 16 attached to each end of the bus bar 12. The isolative support member 16 may be made of a non-conductive material such as plastic in order to electrically insulate the bus bar 12 from the mounting surface to prevent the electrical charge running through the bus bar 12 from passing through the insulating support members 16 into the mounting surface.

The support member 16 shown in FIGS. 2A and 6 are secured to the bus bar via a bolt, screw or other fastener 36 inserted through a hole 38 proximate the end of the bus bar 12. The fastener 36 extends though the hole 38 in the bus bar 12 and into the plastic or other electrically non-conductive material of the support member body 40.

Figure 5:
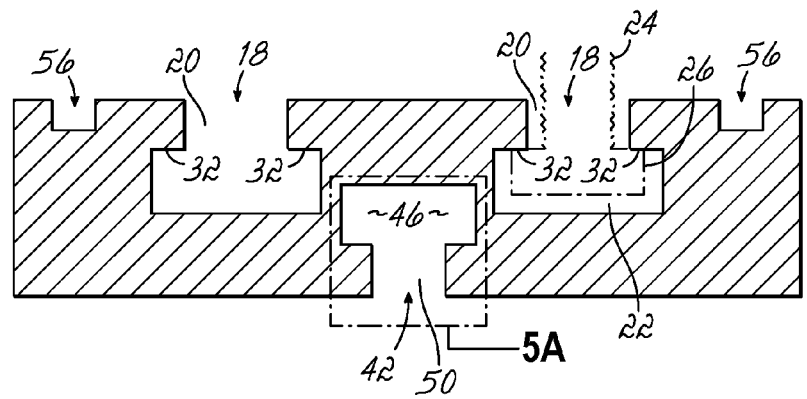
FIG. 5 is a cross sectional view of a yet further embodiment of a slotted bus bar for electric distribution according to this invention.
Figure 5A:
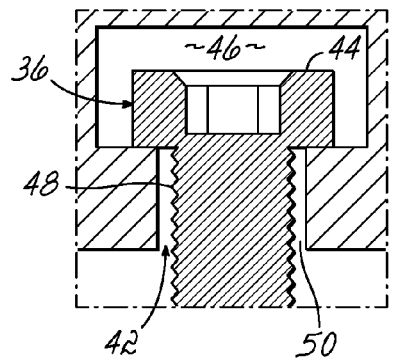
FIG. 5A is a detailed view of region A from FIG. 5.

An alternative attachment scheme for the support member 16 to the bus bar 12 is shown in the bus bar embodiment of FIGS. 5 and 5A in which a slot 42 is formed in the bottom surface of the bus bar 12. The slot 42 of the embodiment of the bus bar 12 shown in FIGS. 5 and 5A is generally T-shaped similar to the slots 18 formed on the upper surface of the bus bar 12 for attachment of the lugs or attachment features 14 as previously discussed. With the slot 42 formed on the bottom surface of the bus bar 12, the support member 16 is secured to the bus bar 12 via a bolt 36 with the head 44 of the bolt 36 seated in the expanded cavity 46 of the slot 42 and the shaft 48 of the bolt 36 extending from the head 44 through the narrow channel 50 of the slot 42 for attachment of the support member 16. With the attachment arrangement for the support member 16 as shown in FIGS. 5 and 5A, the support members 16 may be slidably positioned along the length of the bus bar 12 for proper positioning and support of the bus bar system 10. Additionally, access to the head 44 of the fastener 36 is not required via the upper face of the bus bar 12 as with the attachment arrangement for the support member 16 shown in FIGS. 2A and 6. As such, the T-slot arrangement for attachment of the support member 16 on the bottom surface of the bus bar 12 provides access to the entire upper surface of the bus bar 12 for the attachment features and lugs 14 for optimum utilization of the bus bar 12. Nevertheless, with the head 44 of the fastener countersunk so that it is flush with the upper surface of the bus bar 12 according to the arrangement shown in FIGS. 2A and 6, once the support members 16 are secured to the bus bar 12, the attachment features or lugs 14 can be positioned anywhere along the upper surface of the bus bar 12, including on top of the head 44 of the fastener likewise utilizing the entire surface of the bus bar 12 for attachment to the conductors 9 or other components. Naturally, as one of ordinary skill in the art will appreciate, the shape of any of the slots 18, 42 shown or described herein may be varied while still remaining within the scope of this invention.

The support members 16 according to another embodiment of this invention are shown in FIG. 3 and include spaced, generally molded support members 16 which are coupled to the bus bar 12 at the end of the bus bar 12. These support members 16 avoid the need for drilling any holes in the bus bar 12. Support members 16 do not require a hole, slot for other formation in the bus bar 12 for attachment. The support members 16 include laterally extending feet 16a which may include holes 16b for mounting the bus bar assembly 10 to a support surface. The support members 16 of FIG. 3 may include tabs or other features which are seated within the various grooves, slots or features of the bus bar 12 for secure attachment and coupling of the bus bar to the support member 16. The support member 16 of the embodiment of FIG. 3 is likewise made from a plastic, rubber or other non-conductive insulating material.

Another feature of various embodiments of this invention is shown in the bus bars 12 of FIGS. 2A-6 and includes a downwardly projecting tab 52 on a bottom surface of the attachment feature or lug 14. As most clearly shown in FIG. 6, the tab 52 projects downwardly from the bottom surface of the lug 14 and engages an edge 54 of the bus bar 12. The interaction between the tab 52 and the bus bar 12 inhibits or prevents rotation of the attachment feature 14 relative to the bus bar 12. In this manner, during tightening of the bolt which secures the attachment feature 14 to the bus bar 12, the lug 14 does not rotate or spin because such movement is prevented by the tab 52 seated against the edge 54 of the bus bar 12. In the embodiments of the bus bar 12 shown in FIGS. 2A-5, the tab 52 may be seated within a groove 56 formed in the upper surface of the bus bar 12. The groove 56 may extend the entire length of the bus bar 12 thereby allowing for positioning of the attachment features 14 anywhere along the length of the bus bar 12 with the respective tab 52 seated within the groove 56 to inhibit rotation of the attachment feature 14 relative to the bus bar 12. The embodiment of this invention shown in FIG. 6 utilizes the outer side edge 54 of the bus bar 12 for engagement with the tab 52 to prevent relative rotational movement while the groove 56 is provided in other embodiments. These and other features comprise an anti-rotation feature of the bus bar system according to various embodiments of this invention.

Another feature of various embodiments of the bus bar 12 according to this invention is clearly shown in the embodiment of FIGS. 2A-5 in which an undercut feature or chamfer 58 is formed in the outer side edges of the bus bar 12. One purpose of this feature is to reduce or minimize the weight and quantity of material required for forming the bus bar 12. Naturally, this feature or chamfer 58 may take a variety of shapes, configurations or sizes and be positioned as shown in the drawings or at other locations on the bus bar 12 as appropriate.

A bus bar 12 of this invention has distinct advantages structurally and for convenience in manufacture and in assemblage. In the first place, the bar 12 can be extruded in a continuous piece of the stock length desired, and cut into the lengths required for the particular installation. Further, the current carrying capacity of the bar 12, at each cross section along its length, is equal to the current carrying capacity at every other cross section, as the cross section is uniform in size and shape throughout the entire length of the bar 12. Further, attachment features 14 for making electrical connections can be disposed in any position desired along the slots 18 and there secured to the bus bar 12. The bar 12 can be extruded with T-shaped longitudinal slots 18, 42 and grooves 56 on the faces of the side walls.

From the above disclosure of the general principles of this invention and the preceding detailed description of at least one embodiment, those skilled in the art will readily comprehend the various modifications to which this invention is susceptible. Therefore, we desire to be limited only by the scope of the following claims and equivalents thereof.

We claim:

1. An electrical distribution bus bar assembly comprising:
   a bus bar comprising an elongate metal body;
   a plurality of slots being generally parallel and spaced from one another on a face of the elongate metal body, each slot being along the length of the bus bar and extending into the body from the face of the body, each slot comprising a cross-section having a narrow channel extending from the face into a broader cavity within the body; and
   at least one attachment feature electrically coupled to bus bar via the at least one slot;
   a conductor connected to the attachment feature and electrically coupled to the bus bar therethrough; and an anti-rotation feature juxtaposed relative to the at least one attachment feature and the bus bar to inhibit rotation of the at least one attachment feature relative to the bus bar.

2. The bus bar assembly of claim 1 wherein the anti-rotation feature is spaced from the at least one slot on the elongate metal body.

3. The bus bar assembly of claim 1 wherein at least a portion of the anti-rotation feature extends substantially an entire length of the elongate metal body.

4. An electrical distribution bus bar assembly comprising:
a bus bar comprising an elongate metal body;
at least one slot along the length of the bus bar and extending into the body from a face of the body, each of the at least one slots comprising a cross-section having a narrow channel extending from the face into a broader cavity within the body; and
at least one attachment feature electrically coupled to bus bar via the at least one slot;
a conductor connected to the attachment feature and electrically coupled to the bus bar therethrough; and
an anti-rotation feature juxtaposed relative to the at least one attachment feature and the bus bar to inhibit rotation of the at least one attachment feature relative to the bus bar;
wherein the anti-rotation feature further comprises an edge of the elongate metal body and further comprises a groove in the elongate metal body and the groove further comprises the edge;
wherein the groove is in the face of the elongate metal body and spaced from a periphery of the elongate metal body.

5. The bus bar assembly of claim 1 wherein the anti-rotation feature further comprises a tab extending from the attachment feature and juxtaposed to the elongate metal body.

6. The bus bar assembly of claim 1 wherein the attachment feature further comprises a mechanical fastener having a threaded shaft and a head whereby the head is seated within the cavity of the at least one slot and the threaded shaft extends through the narrow channel of the at least one slot, whereby the mechanical fastener and associated attachment feature are positionable along an entire length of the elongate metal body.

7. The bus bar assembly of claim 1 wherein the attachment feature comprises a lug.

8. An electrical distribution bus bar assembly comprising:
a bus bar comprising an elongate metal body: a plurality of slots being generally parallel and spaced from one another on a face of the elongate metal body, each slot being along a length of the bus bar and extending into the body from the face of the body, each slot comprising a cross-section having a narrow channel extending from the face into a broader cavity within the body: at least one attachment feature electrically coupled to the bus bar via at least one of the plurality of slots: an anti-rotation feature juxtaposed relative to the at least one attachment feature and the bus bar to inhibit rotation of the at least one attachment feature relative to the bus bar: and a conductor connected to the attachment feature and electrically coupled to the bus bar therethrough.

9. The bus bar assembly of claim 1 further comprising:
a plurality of support members cooperating to support the bus bar above an underlying surface.

10. The bus bar assembly of claim 1 further comprising:
a support member slot oriented along the length of the bus bar and extending into the body from a second face of the body, the support member slot comprising a support member cross-section having a support member narrow channel extending from the second face into a support member broader cavity within the body; and
at least one support member to support the bus bar above an underlying surface, the at least one support member being coupled to the bus bar via the support member slot, whereby the at least one support member is positionable along an entire length of the support member slot.

11. An electrical distribution bus bar assembly comprising: a bus bar comprising an elongate metal body; a plurality of slots each parallel to and spaced from one another and along the length of the bus bar and extending into the body from a first face of the body, the slot comprising a first cross-section having a first narrow channel extending from the first face into a first broader cavity within the body; and at least one attachment feature electrically coupled to bus bar via at least one of the slots; a conductor connected to the attachment feature and electrically coupled to the bus bar therethrough; a support member slot oriented along the length of the bus bar and extending into the body from a second face of the body, an anti-rotation feature juxtaposed relative to the at least one attachment feature and the bus bar to inhibit rotation of the at least one attachment feature relative to the bus bar, the support member slot comprising a second cross-section having a second narrow channel extending from the second face into a second broader cavity within the body; at least one support member to support the bus bar above an underlying surface, the at least one support member being coupled to the bus bar via the support member slot, whereby the at least one support member is positionable along an entire length of the support member slot.

12. The bus bar assembly of claim 11 wherein the first face is oriented upwardly and the second face is oriented downwardly.

13. The bus bar assembly of claim 11 wherein the support member slot extends substantially an entire length of the second face.

14. The bus bar assembly of claim 11 further comprising a plurality of support members cooperating to support the bus bar above an underlying surface and each coupled to the support member slot.

15. The bus bar assembly of claim 11 wherein the at least one support member further comprises a mechanical fastener having a threaded shaft and a head whereby the head is seated within the second cavity of the support member slot and the threaded shaft extends through the second narrow channel of the support member slot, whereby the mechanical fastener and support member are positionable along an entire length of the support member slot.

16. The bus bar assembly of claim 15 wherein the at least one support member and associated mechanical fastener do not extend to the first face of the bus bar.

17. The bus bar assembly of claim 11 further comprising:
an anti-rotation feature juxtaposed relative to the at least one attachment feature and the bus bar to inhibit rotation of the at least one attachment feature relative to the bus bar.

18. The bus bar assembly of claim 8 further comprising:
a support member slot oriented along the length of the bus bar and extending into the body from a second face of the body, the support member slot comprising a support member cross-section having a support member narrow channel extending from the second face into a support member broader cavity within the body; and at least one support member to support the bus bar above an underlying surface, the at least one support member being coupled to the bus bar via the support member slot, whereby the at least one support member is positionable along an entire length of the support member slot.

19. The bus bar assembly of claim 8 wherein the face of the body is oriented upwardly and the second face of the body is oriented downwardly.

* * * * *